United States Patent

Roloff et al.

[11] Patent Number: 5,918,643
[45] Date of Patent: Jul. 6, 1999

[54] PLASTIC TUBE WITH VARYING LAYER THICKNESS

[75] Inventors: Dietmar Roloff, Bielefeld; Michael Schieb, Schöllkrippen; Klaus Straszewski, Öpfingen, all of Germany

[73] Assignee: Form Rite, Auburn Hills, Mich.

[21] Appl. No.: 08/855,306

[22] Filed: May 13, 1997

[51] Int. Cl.$^6$ ...................................................... F16L 11/00
[52] U.S. Cl. ........................... 138/137; 138/140; 138/141
[58] Field of Search ..................... 138/137, 140, 138/141, 177, 178

[56] References Cited

U.S. PATENT DOCUMENTS

| | | | |
|---|---|---|---|
| 3,598,157 | 8/1971 | Farr | 138/177 X |
| 3,720,235 | 3/1973 | Schrock | 138/177 X |
| 3,902,531 | 9/1975 | Thawley | 138/137 |
| 4,283,447 | 8/1981 | Flynn | 138/137 X |
| 4,629,218 | 12/1986 | Dubois | 138/177 X |
| 5,125,913 | 6/1992 | Quackenbush | 138/140 X |
| 5,279,332 | 1/1994 | Winter et al. | 138/137 X |
| 5,482,090 | 1/1996 | Yamanashi | 138/137 X |
| 5,560,398 | 10/1996 | Pfleger | 138/137 X |
| 5,588,468 | 12/1996 | Pfleger | 138/137 X |

*Primary Examiner*—Patrick Brinson
*Attorney, Agent, or Firm*—Howard & Howard

[57] ABSTRACT

A plastic tube, particularly for use in motor vehicles, having one or more layers, has defined varying thicknesses and/or a defined varying number of layers in its longitudinal direction, such that the given end product has a characteristic profile specific to its application.

17 Claims, 1 Drawing Sheet

PLASTIC TUBE WITH VARYING LAYER THICKNESS

BACKGROUND

The present invention provides a plastic tube having one or more layers, in which the individual layer thicknesses and/or the overall layer thickness varies.

The use of plastic tubes for different applications in automobile construction is known. For example, tubes made of polyamide are used for fuel, vacuum, and pneumatic lines. Because of increasing environmental protection requirements, multiple layer tubes are being used more and more frequently in recent times, particularly for fuel lines.

These known plastic lines always represent a compromise in the search for an optimal solution in regard to all requirements, such as flexibility, permeation, behavior with regard to fire, impact resistance, as well as resistance to pressure. The main reason for this is that the tube must be manufactured in a continuously nonvarying extrusion process.

SUMMARY OF THE INVENTION

The present invention provides plastic tubes particularly for use in automobile construction which exhibit optimal characteristic profiles specific to their final applications.

By the defined varying layer thicknesses, especially for a multilayer tube, all requirements which involve the partial areas of the manufacturing line are met.

In this process, the following possibilities result, among others:

Partial areas having a higher temperature resistance can be constructed, e.g., in proximity to structural components having intense radiant heat.

Partial areas having a higher fire resistance can be constructed, e.g., in proximity to exhaust systems and electrical assemblies.

Partial areas having a higher flexibility, i.e., exhibiting lower Shore hardnesses, can be constructed, e.g., in areas in which the lines are bent or for lines requiring high vibration or noise damping.

Partial areas can have a resistance to chemicals, e.g., in proximity to brake fluid containers as well as oil and cooling water filling areas. For multilayer tubes, in which there are layers consisting of materials which are nonresistant to certain media, these layers can be omitted at the line ends.

Line ends of tubes which are multilayer in their continued progression can be constructed having a single layer in order to obtain optimal impermeability properties. There is no need for bonding layers.

Each of the layers in a single tube may be varied in different axially spaced areas to provide each area with differing properties. The single tube therefore can include a first area to provide higher temperature resistance, a second area to provide higher flexibility, a third area to provide resistance to chemicals, a fourth area to provide optimal impermeability properties and a fifth area to provide higher fire resistance.

The manufacture of the plastic tube according to the invention takes place in multilayer extrusion systems in which a discontinuous output of the individual extruders is possible. For this purpose, the rotational speed of the screw and/or the rotational speed of the melt pumps is preferably controlled.

A further embodiment according to the invention provides plastic tubes of varying inner diameter. In this process, throttling behavior or throttle-free integration on the finished line can be achieved. Extrusion systems are used for this purpose in which the rotational speed of the screw and/or the rotational speed of the melt pumps and/or the speed of draw-off devices can be controlled independently of each other.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
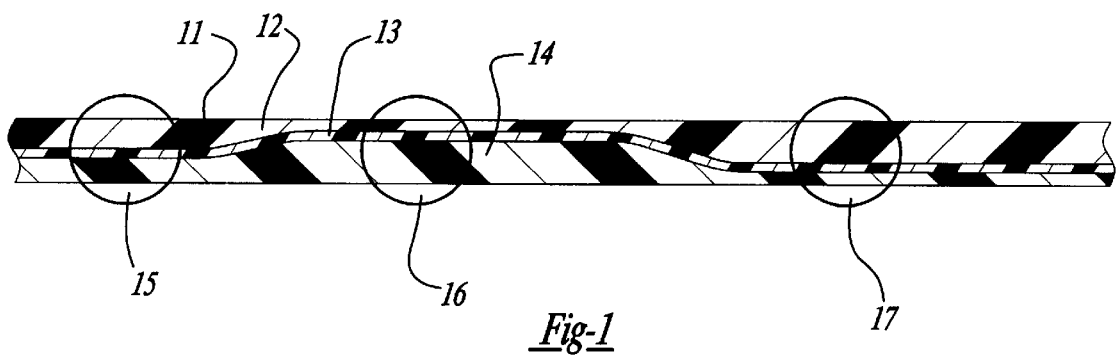
FIG. 1 is a sectional representation of the tube wall structure of a three-layer tube having varying layer thicknesses of the inner and outer layer.

FIG. 1 is a section through the tube wall of a three-layer tube (11) having an outer layer (12), middle layer (13), and inner layer (14). In the longitudinal direction of the tube (11), the layer thicknesses of the outer layer (12) and the inner layer (14) vary such that the middle layer (13) has a constant thickness. In the area (15), the outer layer (12) and the inner layer (14) show approximately equivalent layer thicknesses, while in the continued progression of the tube (11) in the area (16), the layer thickness of the outer layer (12) becomes reduced, and correspondingly the layer thickness of the inner layer (14) becomes enlarged. In the area (17), a reciprocal layer thickness change is depicted. Here, the layer thickness of the inner layer (14) becomes reduced while at the same time the layer thickness of the outer (12) layer increases. Generally, the thicknesses of the layers are between 0 and 8 mm.

According to the invention, the transitions between the areas (15) and (16) as well as between the areas (16) and (17) should be minimal.

The manufacture of the plastic tube according to the invention takes place in multilayer extrusion systems in which a discontinuous output of the individual extruders is possible. For this purpose, the rotational speed of the screw and/or the rotational speed of the melt pumps is preferably controlled.

Figure 2:
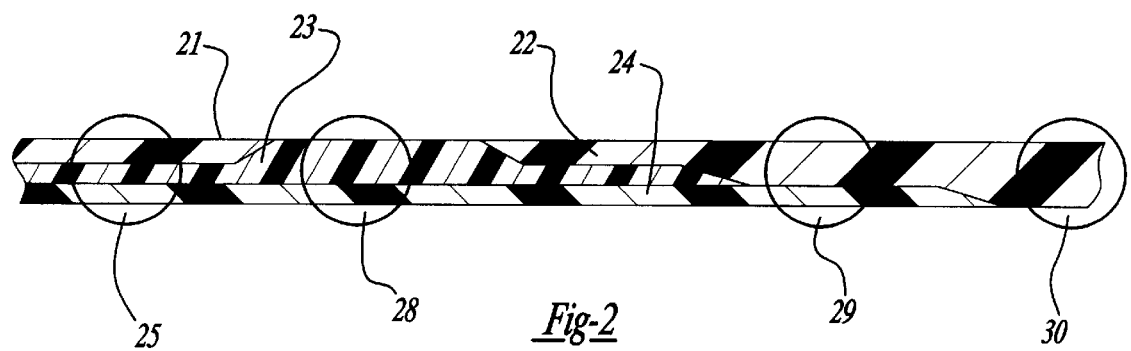
FIG. 2 is a sectional representation of the tube wall structure of a three-layer tube having varying layer thicknesses of the inner, middle, and outer layers, such that the inner and middle layer thicknesses amount to zero in places.

FIG. 2 is a section through the tube wall of a three-layer tube (21) consisting of the outer layer (22), middle layer (23) and the inner layer (24) such that the layer thicknesses of all three layers (22), (23), and (24) vary. In the area (25), the outer layer (22) and the inner layer (24) again exhibit approximately equal layer thicknesses. It should be understood that the tube (21) shown in FIG. 2 could be a different tube than that shown in FIG. 1, or could be a different section of the same tube shown in FIG. 1. In the area (28), the layer thickness of the middle layer (23) is increased in such a way that this middle layer (23) represents the outer contour of the tube (21), with the consequence that the layer thickness of the outer layer (22) amounts to zero in this area (28). In the further progression of the tube (21), the layer thickness of the middle layer (23) is continuously or stepwise until it amounts to zero in the area (29), while the layer thickness of the outer layer (22) increases, corresponding to the reduction of the layer thickness of the middle layer (23).

In the area (30), the layer thickness of the inner layer (24) has likewise changed to zero, so that here the tube wall of the tube (21) consists exclusively of the original outer layer (22), whose layer thickness now has a value corresponding to the original layer thicknesses of the outer layer (22), middle layer (23), as well as the inner layer (24). Again, the transitions between the areas (29) and (30) should, according to the invention, be designed minimally.

Each of the areas 15, 16, 17, 25, 28, 29 and 30, if provided on a single tube may provide any of the following properties: higher temperature resistance, higher flexibility, resistance to chemicals, optimal impermeability to properties or higher fire resistance.

Figure 3:
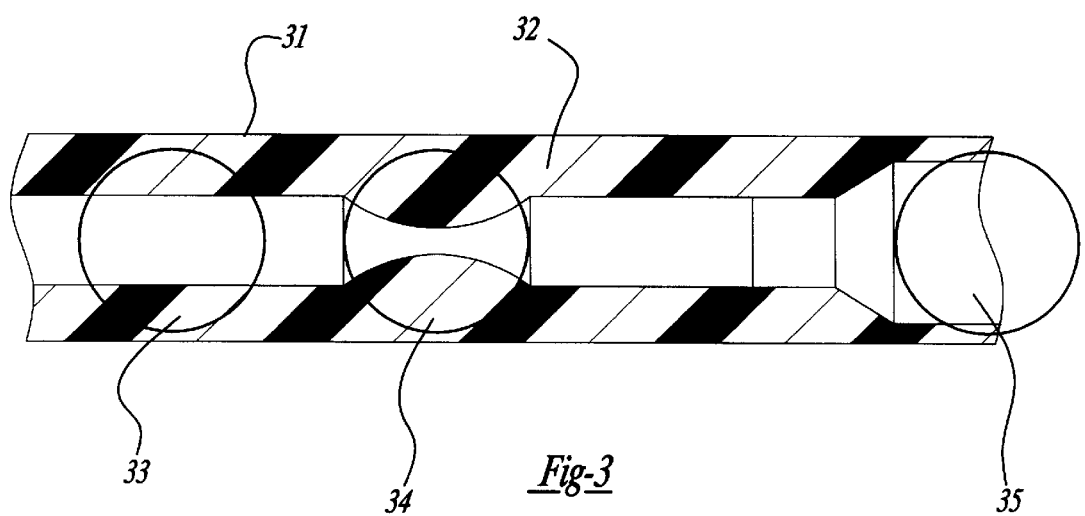
FIG. 3 is a sectional representation of a single layer tube having a constant outer diameter and a varying inner diameter.

FIG. 3 is a section through a tube (31) where the tube (31) has a constant outer diameter as well as varying inner diameters. It should be understood that the tube (31) shown in FIG. 3 could be a different tube than that shown in FIG. 1, or alternatively could be another section of the same tube. The main dimensions of the tube (31) are shown in area (33), while the inner diameter becomes considerably narrower in the further progression of the tube (31) in the area (34). Preferably, the inside diameter widens by a maximum of 25% and narrows by a maximum of 80% relative to the nominal widths.

Area (35) shows a reciprocal development such that the inner diameter has now been clearly increased as opposed to the main dimensions.

For the embodiments shown in FIGS. 1–3, it should be understood that the layers could comprise material such as PA11, PA12, PAS, POM, PMMA, PE, PP, PFA, ETFE, PVDF and their copolymers. The plastic tube can also be formed as a multichamber tube.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A plastic tube, especially for use in the construction of automotive vehicles, comprising at least three layers having thicknesses which vary in an axial direction in a complementary manner such that a total thickness of said at least three layers is constant.

2. The plastic tube as claimed in claim 1, wherein an outside diameter of the tube along the entire length of the tube is maintained constant and an inside diameter of the tube in the axial direction widens by a maximum of 25% and narrows by a maximum of 80%, relative to the nominal width.

3. The plastic tube as claimed in claim 1, wherein the thickness of the individual layers is within a range from 0–0.8 mm.

4. The plastic tube as claimed in claim 1, wherein each of said at least three layers have thicknesses that vary in a complementary manner in the axial direction such that the total thickness of the three layers remains constant.

5. A plastic tube comprising a plurality of layers each having a layer thickness which varies in an axial direction such that the total thickness of the layers remains constant, wherein the thicknesses of said layers are varied in a first area to provide higher temperature resistance.

6. The plastic tube of claim 5, wherein said thicknesses of said layers are varied in a second area axially spaced from said first area to provide higher flexibility.

7. A plastic tube comprising a plurality of layers each having a layer thickness which varies in an axial direction such that the total thickness of the layers remains constant, wherein said thicknesses of said layers are, varied in a first area to provide resistance to chemicals.

8. A plastic tube comprising a plurality of layers each having a layer thickness which varies in an axial direction such that the total thickness of the layers remains constant, wherein said thicknesses of said layers are varied in a fourth area to provide optimal impermeability properties.

9. A plastic tube comprising a plurality of layers each having a layer thickness which varies in an axial direction such that the total thickness of the layers remains constant, wherein said thicknesses of said layers are varied in a fifth area to provide higher fire resistance.

10. A plastic tube comprising a plurality of layers each having a layer thickness which varies in an axial direction such that the total thickness of the layers remains constant, wherein said thicknesses are varied in a first area, a second area axially spaced from said first area, a third area axially spaced from said first area and said second area, wherein said thicknesses are varied in said first area to provide higher temperature resistance than in said second area and said third area, said thicknesses are varied in said second area to provide higher flexibility than in said first area and said third area, and said thicknesses are varied in said third area to provide higher resistance to chemicals than said first area and said second area.

11. A plastic tube comprising a plurality of layers each having a layer thickness which varies in an axial direction such that the total thickness of the layers remains constant, wherein the number of said plurality of layers varies in said axial direction.

12. A plastic tube, especially for use in the construction of automotive vehicles, comprising:
   a plurality of layers each having a thickness;
   a first area axially spaced from a second area,
   a third area axially spaced from said first area and said second area, wherein said thicknesses are varied in said first area to provide higher temperature resistance than in said second area and said third area, said thicknesses are varied in said second area to provide higher flexibility than in said first area and said third area, and said thicknesses are varied in said third area to provide higher resistance to chemicals than said first area and said second area.

13. The plastic tube of claim 12, wherein the number of said plurality of layers varies in said axial direction.

14. A plastic tube comprising a plurality of layers each having a layer thickness which varies in an axial direction such that the total thickness of the layers remains constant, wherein said thicknesses are varied in a first area, a second area axially spaced from said first area, and a third area axially spaced from said first area and said second area, said layer thicknesses of said plurality layers varying in each of said first, second and third areas to provide different properties.

15. The plastic tube of claim 14 wherein said different properties provided in each of said first, second and third areas are selected from the group of temperature resistance, chemical, resistance, flexibility and permeability.

16. A plastic tube comprising a plurality of layers each having a layer thickness which varies in an axial direction such that the total thickness of the layers remains constant, wherein said plurality of layers comprises at least three layers, each of said three layers varying in said axial direction, each of said three layers varying in thickness in a complementary manner in said axial direction to maintain constant total thickness.

17. The plastic tube of claim 16 wherein the thickness of at least one of said at least three layers varies to zero in at least one area.

* * * * *